April 14, 1942. J. C. CROWLEY 2,279,367
TORCH
Filed March 3, 1938 2 Sheets-Sheet 1
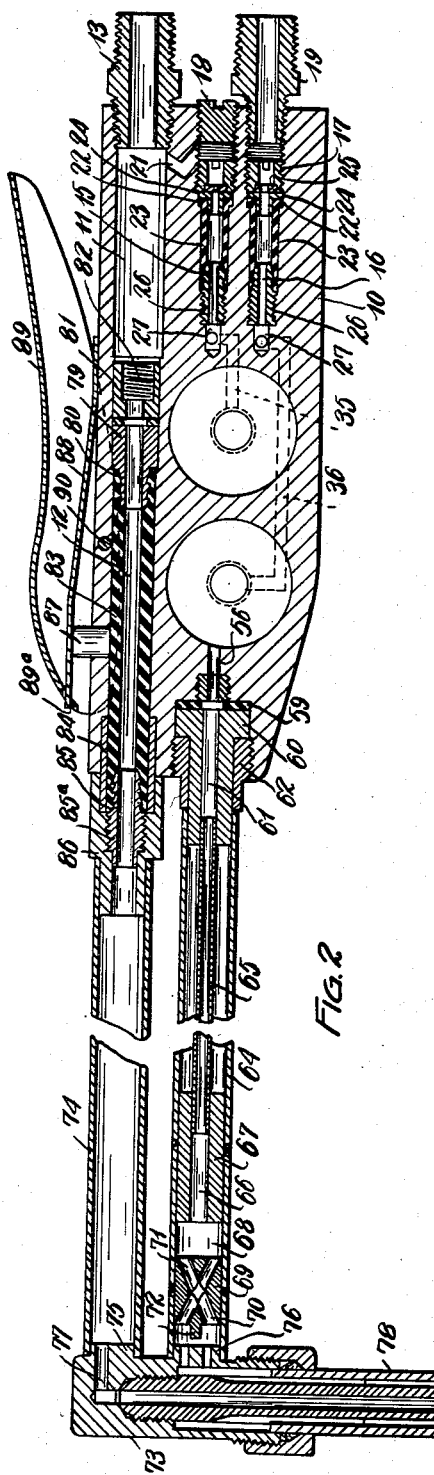
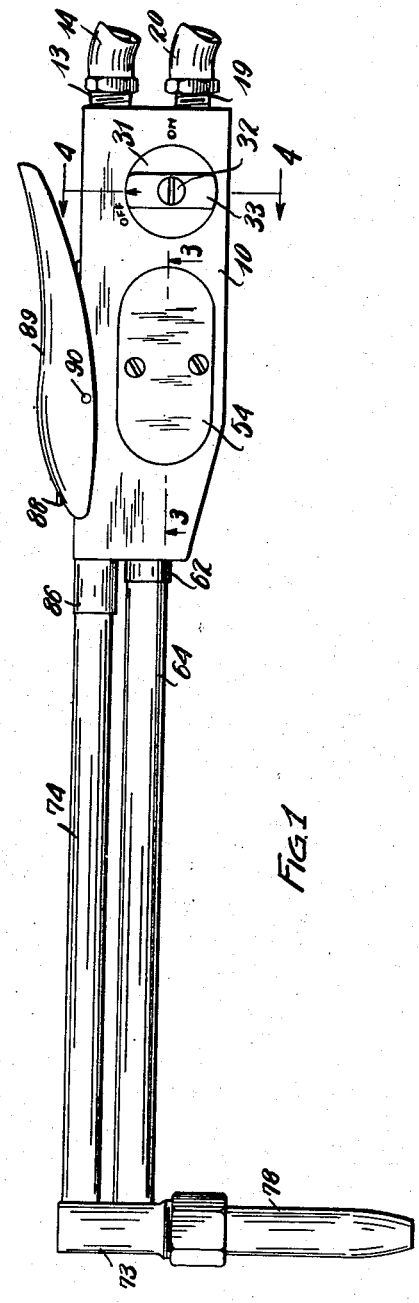
INVENTOR.
JOHN C. CROWLEY
ATTORNEYS April 14, 1942.     J. C. CROWLEY     2,279,367
TORCH
Filed March 3, 1938     2 Sheets-Sheet 2
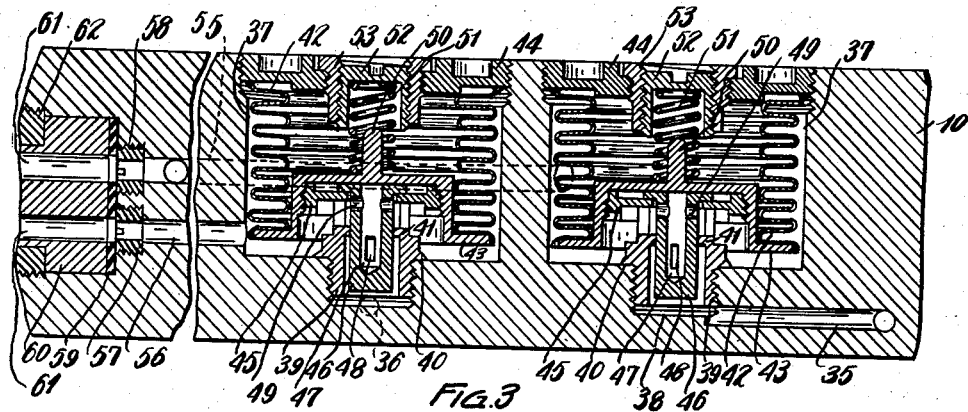
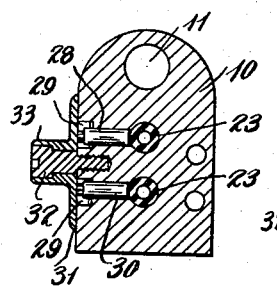
Fig.4
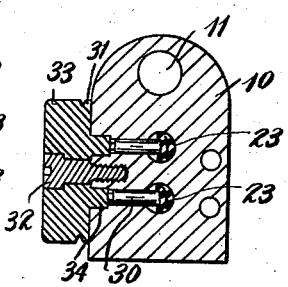
Fig.5
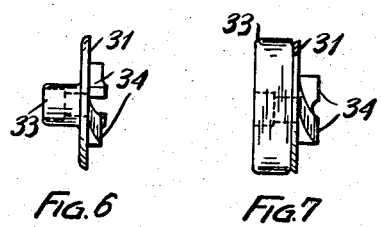
Fig.6     Fig.7
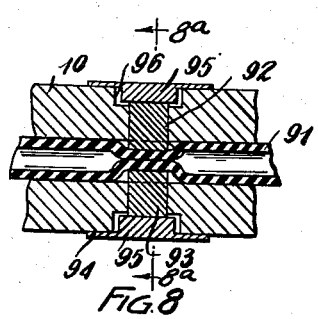
Fig.8
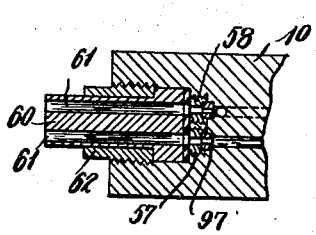
Fig.8a.     Fig.9
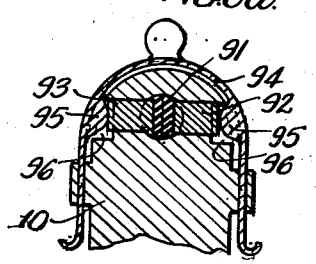
INVENTOR.
JOHN C. CROWLEY
BY
Kwis Hudson & Kent
ATTORNEYS Patented Apr. 14, 1942

2,279,367

UNITED STATES PATENT OFFICE 2,279,367

TORCH

John C. Crowley, Cleveland Heights, Ohio, assignor to The Dill Manufacturing Company, Cleveland, Ohio, a corporation of Ohio Application March 3, 1938, Serial No. 193,733

11 Claims. (Cl. 158—27.4)

This invention relates to a cutting torch or blow pipe adapted for cutting or welding metal or for other similar purposes.

A cutting torch or blow pipe of the type to which the present invention relates is connected to a source of suitable inflammable gas under pressure and also to a source of oxygen under pressure, the gas and oxygen being suitably mixed in the torch to produce the required and correct combustible mixture. There is also provision in the torch for issuing therefrom a jet of high pressure oxygen alone.

When a torch of this kind is used for the cutting of metal, the metal is first preheated by means of the flame produced at the nozzle of the torch by the ignited combustible mixture of gas and oxygen, and after the metal has been sufficiently heated the jet of the high pressure oxygen alone is directed against the metal and acts to destroy the carbon in the metal and to effect a severing thereof. When the torch is used for the welding of metal it is necessary only to employ the flame of the ignited combustible mixture of oxygen and gas.

An object of the present invention is to provide an improved cutting torch or blow pipe, which is so constructed as to be readily operated, require a minimum of attention on the part of the operator, and which is extremely simple in construction and particularly with respect to the valves.

Another object is to provide a cutting torch or blow pipe embodying improved flow-control means such that a constant predetermined flow-pressure of gas and oxygen is delivered to the nozzle, irrespective of changes in the pressures in the supply lines.

A further object is to provide in a cutting torch or blow pipe improved means such that a perfect combustible mixture is present at the nozzle at all times and which does not require manipulation of control valves during use to compensate for any drop of pressure in the supply lines.

A further object is to provide a cutting torch or blow pipe wherein the flow of combustible mixture of gas and oxygen can be controlled by a single control member which remains in the "on" or operative position to which it has been moved by the operator until the latter again moves said member.

A further object is to provide a cutting torch or blow pipe wherein the passage of the unmixed oxygen to the nozzle for cutting the metal is controlled by a valve which remains in the closed position until changed by the operator.

A still further object is to provide in a cutting torch or blow pipe improved valves for controlling the flow of oxygen and gas and also improved automatically functioning means for regulating the flow pressure of the oxygen and gas for the combustible mixture.

A still further object is to provide in a cutting torch or blow pipe and in the mixing chamber thereof improved means for creating turbulence of the flowing gas and oxygen, thus insuring a thorough mixture thereof.

Further and additional objects and advantages not hereinbefore specified will become apparent hereinafter during the detailed description which is to follow of embodiments of the different phases of the invention and which are illustrated in the accompanying drawings wherein:

Fig. 1 is a side elevational view of the cutting torch or blow pipe on a reduced scale.

Fig. 2 is a longitudinal sectional view through the cutting torch or blow pipe on a larger scale than Fig. 1, the dual valves controlling the flow of gas and oxygen into the torch to provide the combustible mixture, and the valve controlling the flow of oxygen alone to provide the cutting jet being shown in the open position.

Fig. 3 is a fragmentary sectional view on a larger scale than either Figs. 1 or 2 and is taken substantially on line 3—3 of Fig. 1 looking in the direction of the arrows and illustrates the automatic but adjustable means for controlling the flow pressure of the gas and oxygen flowing through the cutting torch or blow pipe for the combustible mixture.

Fig. 4 is a transverse sectional view through the torch and is taken substantially on line 4—4 of Fig. 1 looking in the direction of the arrows, and shows the dual control valves for controlling the in-flowing oxygen and gas together with the valve operating means associated therewith, said valves being shown in the open position.

Fig. 5 is a view similar to Fig. 4 but showing the dual valves closed and the operating means therefor in the closed position.

Figs. 6 and 7 are detail elevational views of the cam member of the operating means for the dual valves shown in Figs. 4 and 5; in Fig. 6 the cam member being shown in the position it occupies when the valves are open, while in Fig. 7 it is shown in the position it occupies when the valves are closed.

Fig. 8 is a detached fragmentary longitudinal sectional view of a modified form of valve for controlling the passage of the high pressure oxygen to the cutting nozzle, together with the operating means for said valve, Fig. 8ᵃ is a detached fragmentary transverse vertical sectional view of the modified form of valve for controlling the passage of the high pressure oxygen to the cutting nozzle as shown in Fig. 8, and is taken substantially on line 8ª—8ª of Fig. 8 looking in the direction of the arrows.

Fig. 9 is a fragmentary sectional view showing the metering orifices for the gas and oxygen of the combustible mixture located in a different portion of the torch than in Fig. 2 wherein said metering orifices are disclosed as being arranged in advance of the dual valves.

The cutting torch or blow pipe comprises a body portion 10, constructed of suitable material such as metal and provided adjacent its upper side with a longitudinally extending passage including a portion 11 of relatively large diameter and a portion 12 of relatively small diameter. The outer end of the large diameter portion 11 of the passage is threaded to receive a threaded fitting 13 to which a conduit 14 is connected and which conduit extends to a suitable source of oxygen under pressure. The body 10 beneath the portion 11 of the passage is provided with a pair of vertically spaced (as viewed in the drawings) parallel longitudinally extending circular recesses 15 and 16, the right hand ends of which are of enlarged diameter and are threaded to receive threaded sleeves 17 that are employed for a purpose later to be referred to. The recess 15 is closed by a suitable threaded plug 18, while the recess 16 receives a threaded fitting 19 to which is connected a conduit 20 extending to a source of supply of acetylene under pressure or to a source of supply of some other suitable inflammable gas as will be well understood. The recess 15 is in communication with the enlarged portion 11 of the passage by means of a port 21, as clearly shown in Fig. 2. The sleeves 17 in the enlarged portions of the recesses 15 and 16 clamp between their inner ends and the shoulders formed at the inner ends of the enlarged portions of the recesses the flanges 22 of rubber tubes 23 and also the flanges formed on small metal sleeves 24 that extend into the rubber or flexible tubes 23. Disks 25 of suitable material are clamped between the sleeves 17 and the sleeves 24 and these disks are provided with metering orifices, it being noted that the orifice in the disk in the recess 15 is smaller than the orifice of the disk in the recess 16. The rubber or flexible tubes 23 at the ends thereof opposite to the end having the flanges 22 extend around and are interlocked with the tapered ends of plug members 26 that are screwed into position in the inner ends of the recesses 15 and 16, said plug members being provided with passages therethrough communicating at one end with the interior of the tubes 23 and at the other end with the interior of short bores 27, forming in effect continuations of the recesses 15 and 16 as clearly shown in Fig. 2.

The body 10 is provided with a pair of parallel spaced holes or openings 28 extending laterally from the recesses 15 and 16 intermediate the adjacent ends of the plugs 26 and the sleeves 22, the outer ends of the openings or holes 28 terminating in arcuate grooves 29 formed in the side of the body 10. Plunger pins 30 are slidably mounted in the openings 28 and their inner ends engage the tubes 23 while their outer ends extend into the arcuate grooves 29 when the tubes 23 are in the open or uncollapsed condition.

A disk 31 is rotatably mounted on the side of the body 10 by means of a pivot screw 32, which screw forms an axis for the disk 31 concentric to the arcuate grooves 29. The disk 31 is provided with an outwardly projecting diametrically extending portion 33 through which the screw 32 extends and which portion constitutes an operating handle for the disk. The disk 31 on its inner side is provided with a pair of cam projections 34 that extend into the arcuate grooves 29 and have their inner ends in contact with the outer ends of the plunger pins 30.

When the disk 31 is in the position shown in Figs. 1 and 5 the cam projections 34 have pressed the plunger pins 30 inwardly until the inner ends of the pins have collapsed the tubes 23 and closed the same against the passage of oxygen and acetylene therethrough, that is, the pins have been moved to the position shown in Fig. 5 and the tubes 23 completely collapsed or closed, as indicated.

The position of the cam disk 31 just referred to is naturally the "off" position that is employed when the torch is not in use. When the cam disk 31 is moved from the position shown in Figs. 1 and 5 toward the position shown in Fig. 4 and wherein the portion 33 extends horizontally of the disk, the cam projections are in such position that the resiliency of the tubes 23 and the pressure of the gas and oxygen may expand the tubes and move the pins 30 outwardly in their openings 28, until the tubes 23 are in the fully opened or uncollapsed condition and gas and oxygen are flowing unrestrictedly therethrough. It will be understood that there is sufficient friction between the inner face of the disk 31 and the body 10, as well as between the cam projections 34 and the walls of the grooves 29 to maintain the disk in the different positions to which the operator may move it.

The short bores 27 are in communication with a short passage 35 and with a long passage 36, as clearly indicated in Fig. 2. The passages 35 and 36 communicate, respectively, with automatic but adjustable pressure flow regulating means or valves and since each of said means is identical with the other only one will be described herein and the same reference characters will be employed to indicate the corresponding parts in each means or valve.

The body 10 is provided with a pair of longitudinally spaced parallel circular recesses 37 that have at their inner ends centrally arranged smaller internally threaded recesses 38, the outer and open ends of the recesses 37 being internally threaded to receive a closure member later to be referred to. Threaded bushings 39 are screwed into the recesses 38 and these bushings are provided with annular locating shoulders 40 which engage the inner end of the recess 37 when the bushings are properly positioned in the recesses 38. The outer ends of the bushings 39, that is the upper ends thereof as viewed in Fig. 3, are provided with inwardly extending annular flanges 41 for a purpose which will later become clear. Diaphragms or bellows 42 are mounted in the recesses 37 and these diaphragms or bellows have their inner ends secured to and closed by flanged cup-shaped members 43. The outer ends of the diaphragms or bellows 42 are closed by means of closure members 44 that screw into the threaded outer ends of the recesses 37 and these closure members are provided with central openings for a purpose later to be explained. The cup-shaped members 43 are internally threaded and have screwed therein clamping collars 45 which clamp in position the bases of valve posts 46 that extend into the bushings 39 as clearly indicated in Fig. 3. The valve posts 46 are provided with centrally located longitudinally extending bores 47, the inner ends of which are in communication with one or more radially extending preferably rectangular openings 48, while the outer ends are in communication with radially extending openings or passages 49. The bottoms of the cup members 43 are provided with centrally disposed outwardly extending projections 50 which receive one of the ends of coil springs 51 that abut against the cup members, the opposite ends of said coil springs extending into and abutting against cup-shaped adjusting nuts 52, in turn screwed into threaded bushings 53 mounted in centrally disposed openings in the closure members 44.

It will be seen that when it is desired to adjust the tension of the springs 51 it will be necessary merely to remove a cover plate 54 that is screwed to the body 10 and covers the closure members 44, after which the adjusting nuts 52 can be moved inwardly or outwardly, as the case may be, to vary the tension of the springs 51.

It will be understood that the diaphragms or bellows 42 are merely of sufficient strength to remain extended under atmospheric pressure or substantially atmospheric pressure, and that the tension of the springs 51 is what determines the pressures at which the diaphragms or bellows move toward the collapsed or toward the expanded condition to effect a movement of the valve posts 46, that is, the diaphragms or bellows merely act to stabilize the valve posts and to maintain the same in the fully opened position when not subjected to pressures above atmospheric pressure.

The oxygen or the acetylene flowing through the passage 35 or the passage 36 enters the bushing 39 and passes through the openings 48 in the valve post 46, and thence through the bore 47 and the openings 49 into the recesses 37. The pressure of the incoming oxygen or gas acts directly on the end of the valve post 46 in the recess, and also the pressure of the oxygen or gas which has passed through the valve post 46 into the recess 37 acts on the member 43 and the bellows 42. When the total pressure of the oxygen or gas reaches a predetermined point the bellows starts to collapse and the valve post and member 43 to move against the action of the spring 51, whereupon the effective area of the openings 48 in the post will be gradually diminished by the opening passing across the annular flange 41 of the bushing 39, it being understood that the valve post 46 has a tight although working fit within the annular flange 41.

In other words, the volume of oxygen or gas flowing into the recess 37 is gradually diminished and thus the flow pressure thereof to the mixing chamber and the nozzle is controlled in proportion to the incoming pressure of the oxygen or gas. When the pressure of the incoming oxygen or gas becomes reduced the parts just enumerated move in the opposite direction under the action of the spring 51 to increase the effective area of the openings 48 in the valve post and thus increase the volume of gas or oxygen flowing into the recess 37 in proportion to the decrease in the pressure of the incoming oxygen or gas.

From the foregoing it will be understood that when the dual control valves are moved from the closed toward the open position the valve posts 46 are in the position indicated in Fig. 3, at which time the openings 48 present their maximum effective areas for the oxygen and gas to flow therethrough into the recesses 37. However, as soon as the pressure of the oxygen or gas in the recesses 37 reaches a predetermined amount the volume of the oxygen or gas flowing through the valve posts starts to be diminished as has been stated by the flanges 41 reducing the effective area of the openings 48. The flow pressure regulating means are so adjusted that the openings 48 will never be completely closed by the flanges 41, so that there is always oxygen or gas flowing through the valve posts into the recesses when the dual control valves are open. However, the effective area of the openings 48 will be changed in proportion to changes in the pressures of the oxygen or gas so that the volume of the oxygen or gas flowing into the recesses will be proportionately varied. In this way the flow pressure of the oxygen and gas through the recesses 37 is accurately regulated by means that does not function with pulsations but is smooth and gradual in its operation and provides at all times a continuous flow of oxygen or gas through the recesses 37 when the main control valves are open and insures a constant pressure flow to the nozzle of the torch.

It will be understood that the springs 51 can be separately adjusted so that different flow pressures can be obtained in the regulating means and also that the openings 48 may be of the same or different sizes and act as metering orifices according to the conditions which it is desired to obtain in the torch. In fact, it might be said that the structure just described constitutes metering devices that are automatically variable in proportion to incoming pressures to correspondingly vary the volume of the oxygen and gas flowing therethrough and thus control the flow pressures of the oxygen or gas.

A passage 55 leads from the recess 37 through which the oxygen is flowing to adjacent the left hand end of the body 10, as clearly shown in Fig. 3, while a short passage 56 similarly extends from the recess 37 through which the acetylene is flowing.

The left hand end of the body 10, as viewed in the drawings, is provided with a longitudinally extending recess having in its bottom counterbores spaced transversely of the body and communicating with the passages 55 and 56, respectively, and in which are located threaded tubular members 57 and 58. A packing 59 is arranged in the bottom of the recess referred to and is held in position by the shouldered inner end of a connecting fitting 60 which has therein passages 61 spaced transversely of the body and communicating through the members 57 and 58 with the passages 55 and 56, respectively, as clearly shown in Fig. 3. The fitting 60 is held in position in the recess by a threaded clamping collar 62, as clearly indicated in Fig. 2. The outer end of the fitting 60 extends into and is secured to a tube 64 projecting from the member 60 to the nozzle of the torch which will later be referred to.

Inside of the tube 64 are a pair of small tubes 65 which have their right hand ends, as viewed in the drawing, extending into the passages 61 in the member 60, while their left hand ends extend into a pair of passages 66 formed in a filler block 67 mounted in the tube 64. It will be seen that the oxygen and gas after passing through the recesses 37 and the passages 55 and 56 pass through the passages 61 and the tubes 65 and thence into the passages 66 of the filler block 67 from whence the oxygen and gas pass into a mixing chamber 68 located in the tube 64 between the filler block 67 and a member 69 also secured in the tube 64.

The member 69 is provided with a pair of diagonal intersecting passages 70 and 71 through which the intermixed oxygen and gas pass. The left hand end of the member 69 is provided with a small baffle 72. The purpose of the passages 70 and 71 and the baffle 72 is to cause a turbulence in the mixed oxygen and gas emerging from the passages in the member 69 and to thus assure a complete intermixture of the oxygen and gas. This member also acts as a baffle or protection against backfire through the torch.

A nozzle connecting member 73 is mounted on the end of the torch and is connected to the tube 64 and to a second tube 74 later to be referred to and located above the tube 64. The nozzle connecting member 73 is provided with a cylindrical lug 75 that extends in and is secured to the left hand end of the tube 74 and with a similar lug 76 that extends in and is secured to the tube 64. The lug 75 is provided with a passage 77 for the high pressure oxygen, while the lug 76 is provided with one or more passages for the intermixed oxygen and gas, and it will be understood that a suitable nozzle, indicated generally at 78, is secured to the member 73 and has passages therein for the intermixed oxygen and gas for providing the heating or welding flame and a central passage therein for the high pressure oxygen that forms the cutting jet. Inasmuch as the construction of the nozzle is well known in the art and forms no part of the present invention further reference thereto is unnecessary.

The manner in which the oxygen and gas for the heating or welding flame passes through the torch and is controlled having been described it will be explained how the high pressure oxygen for the cutting jet passes through the torch and the manner in which it is controlled.

Mounted in the large portion 11 of the high pressure oxygen passage in the body 10 and abutting against the shoulder formed at the inner end of the enlarged portion is a sleeve 79 which has a centrally disposed passage therethrough and is provided at its end with a reduced conical and serrated extension 80 projecting into the small portion 12 of the passage. The sleeve 79 is held in position by means of a bushing 81 that has a driving fit in the portion 11 of the passage and is provided with a threaded counterbore 82 for receiving a tool to enable the bushing to be mounted in or removed from the passage. A suitable gasket is interposed between the bushing 81 and the sleeve 79. A rubber or flexible tube 83 is mounted in the portion 12 of the passage and has its right hand end surrounding and secured to the tapered extension 80 of the sleeve 79, while its opposite end extends through a sleeve 84 secured in a counterbore at the left hand end of the portion 12 of the passage and surrounds and is secured to the tapered serrated projection 85 formed on a member 85a that is screwed into a tubular connecting fitting 86 which has one of its ends surrounding and secured to the sleeve 84, while its opposite end telescopes within the tube 74 and is secured thereto.

It will be seen that a complete passage for the high pressure oxygen is provided through the torch from the fitting 13 to the tube 74, and this passage includes the portion 11 of the body passage, the elements 81, 79, the flexible or rubber tube 83 and the elements 85a and 86.

The passage of the high pressure oxygen through the torch is controlled by collapsing and uncollapsing the tube 83 and, as shown in Fig. 2, this is accomplished by means of a plunger button 87 that operates in an opening formed in the body 10 and which has its lower or inner end contacting the tube 83. A spring 88 has one of its ends secured to the body 10 while its opposite end extends across the outer end of the button 87 and acts to normally force said button inwardly in its opening to collapse the tube 83 and stop the flow of high pressure oxygen through the torch. The end of the spring 88 adjacent the button 87 extends through an opening 89a in one end of a channel-shaped control lever 89 that straddles the body 10 and is pivotally connected thereto by a pivot 90 located intermediate the ends of the lever 89. When the right hand end of the lever 89 is pressed toward the body 10 by the operator, that is, substantially to the position shown in Fig. 2, the left hand end of the spring which extends through the opening 89a is forced or raised upwardly and ceases to exert pressure on the button 87 which then moves outwardly under the expansive action of the tube 83. At this time the tube is open and the high pressure oxygen for the cutting jet is free to flow therethrough to the nozzle. When the operator releases his grip on the lever 89, the left hand end of the spring 88 acting on the lever rocks the same in the opposite direction and at the same time forces the button 87 inwardly to collapse the tube 83 and stop the passage of the high pressure oxygen.

It will be understood that the passage of the high pressure oxygen through the torch can be controlled by the operator maintaining the lever 89 in various positions intermediate its position in which the tube 83 is fully opened or is fully closed.

In Fig. 8 there is disclosed a modified form of valve for controlling the flow through the torch of the high pressure oxygen. In this form the tube 91 corresponds to the tube 83, but it will be noted that said tube is held closed by a pair of plunger buttons 92 and 93 slidable in openings formed in the body 10 on opposite sides of the tube 83. The plunger buttons 92 and 93 are moved to their innermost or valve closing position, as indicated in Fig. 8, by means of a slidable substantially U-shaped member 94 that straddles the body 10 and is provided on its inner side with camming portions 95 located in counterbores 96 at the outer end of the openings in which the pins 92 and 93 operate.

It will be seen that when the member 94 is moved in one direction the camming portions 95 will be so positioned with respect to the outer ends of the buttons 92 and 93 that said buttons can move outwardly under the action of the tube 91 and the latter will then be in the open position. On the other hand, when the member 94 is moved in the opposite direction the camming portions 95 will act upon the buttons 92 and 93 to force the same inwardly to effect a closing or collapsing of the tube 91, as indicated in Fig. 8.

In place of locating the metering orifices in the disks 25, as illustrated in Fig. 2, similar disks 97 may be mounted adjacent the threaded tubular members 58 at the left hand end of the body 10, as indicated in Fig. 9 and these disks 97 can be provided with orifices of different sizes for metering. If this is done the disks 25 located before the dual valves preferably will be provided with orifices of the same size.

Although preferred embodiments of the invention have been illustrated and described herein, it will be understood that the invention is susceptible of various modifications and adaptations within the scope of the appended claims.

Having thus described my invention, I claim:

1. In a torch of the character described, a body having passages therethrough for oxygen and an inflammable gas to form a combustible mixture, a nozzle connected with said passages, flexible tubes in said passages and lining the same when normally expanded, said body being provided with openings extending laterally from said passages in the vicinity of said flexible tubes and with arcuate grooves in its outer surface located at the outer ends of said openings, plungers mounted in said openings having one of their ends in contact with said tubes and their other ends extending into said arcuate grooves, and a control member mounted concentrically with said arcuate grooves and provided with camming portions extending into said grooves and contacting with the ends of said plungers whereby rotation of said control member effects an inward movement of said plungers to collapse said tubes against the walls of said passages.

2. In a torch of the character described, a body having passages therethrough for oxygen and an inflammable gas to form a combustible mixture, manually controlled regulating means in said passages adjacent the inlet end thereof, said body being provided with recesses forming a portion of said passages and located intermediate said regulating means and the inlet and outlet ends of said passages, means in said recesses for automatically regulating the flow pressure of the oxygen and gas admitted to said passages through said regulating means and comprising a tubular bushing having an inwardly extending annular flange, a valve post slidably mounted in said bushing and extending outwardly of the same, said post having a centrally disposed bore extending from without the bushing to within the same and with laterally extending openings located adjacent opposite ends of said bore, said post being operatively connected with a bellows located in said recess, and means tending to move said bellows toward said bushing with a predetermined pressure whereby when the pressure of the oxygen or gas exceeds said predetermined pressure said bellows will tend to collapse and the internal annular flange of said bushing will proportionately close the lateral openings of the post that are within said bushing.

3. In a torch of the character described, a body having a passage therethrough for high pressure oxygen and separate passages therethrough for oxygen and an inflammable gas to form a combustible mixture, and valves in said passages, said valves each comprising a flexible tube lining its respective passage when normally expanded, a slidable plunger carried by said body and operable from the exterior thereof for collapsing said tube against the wall of its respective passage, and means mounted exteriorly of said body for operating said plunger.

4. In a torch of the character described, a body having a passage therethrough for high pressure oxygen and separate passages therethrough for oxygen and an inflammable gas to form a combustible mixture, a nozzle connected with all of said passages, valves in said passages and including flexible tubes lining said passages when normally expanded and slidable plungers mounted in said body for collapsing said tubes against the walls of said passages, a control member mounted on said body for the plunger that collapses the tube in the passage for the high pressure oxygen, and a second single control member mounted on said body for the plungers that collapse the tubes in said separate passages.

5. In a torch of the character described, a body having a passage therethrough for high pressure oxygen and a valve in said passage and comprising a flexible tube lining said passage when normally expanded, a slidable plunger mounted in said body with its inner end in engagement with said tube and its outer end located exteriorly of the body, a spring mounted on said body for normally moving said plunger inwardly to collapse said tube against the wall of the passage and a control member mounted on said body for rendering said spring inactive to permit said plunger to move outwardly when said tube expands.

6. In a torch of the character described, a body having a passage therethrough for pressure fluid, members removably mounted in said passage and spaced longitudinally thereof and tightly fitting therein, said members being provided with bores therethrough, a flexible tube mounted in said passage intermediate said members and having its opposite ends anchored to said members, said tube lining said passage when normally expanded but being restrained against abnormal distention by the wall of said passage, means carried by said body and engaging said tube for collapsing the same against the wall of said passage, and means operable from exteriorly of the body for actuating said last named means.

7. In a torch of the character described, a body provided with passages therethrough for oxygen and an inflammable gas to be commingled to form a combustible mixture, manually controlled valve means in said passages at the inlet end thereof, and means in said passages intermediate said valve means and the outlet end of the passages for controlling the flow pressures and volumes of said oxygen and gas admitted to said passages through said valve means and prior to the same being commingled and in the form of metering devices automatically variable in proportion to incoming pressures and to varying back pressures produced by the use of torch tips having different sized preheat orifices and each device comprising two relatively movable members responsive to said pressures and one of which is provided with a constricted metering passage therethrough and the other of which is provided with means for varying the effective size of the inlet end of said metering passage when the relationship between said members is changed by their relative movement, and means to control said relative movement between said members in relation to the pressures.

8. In a torch of the character described, a body provided with passages therethrough for oxygen and an inflammable gas to be commingled to form a combustible mixture, manually controlled valve means in said passages at the inlet end thereof, and means in said passages intermediate said valve means and the outlet end of the passages for automatically regulating the flow pressures and volumes of said oxygen and gas admitted to said passages through said valve means and prior to the same being commingled and in the form of metering devices automatically variable in proportion to incoming pressures and to varying back pressures produced by the use of torch tips having different sized preheat orifices and each device comprising two relatively slidable members responsive to said pressures and one of which is provided with a constricted metering inlet opening communicating with a passage through said one member and the other of which is provided with means for varying the effective size of said metering opening when the relationship between the members is changed, and means to control said sliding movement between said members in relation to the pressures.

9. In a torch of the character described, a body provided with passages therethrough for oxygen and an inflammable gas to be commingled to form a combustible mixture, manually controlled valve means in said passages at the inlet end thereof, and means in said passages intermediate said valve means and the outlet end of the passages for controlling the flow pressures and volumes of said oxygen and gas admitted to said passages through said valve means and prior to the same being commingled and in the form of metering devices automatically variable in proportion to incoming pressures and to varying back pressures produced by the use of torch tips having different sized preheat orifices and each device comprising a slidable member provided with a bore therethrough and a constricted metering inlet opening to said bore and movable in response to incoming pressures, a second member operatively associated with said slidable member and provided with means for varying the effective size of said metering inlet opening when the relationship between said members is changed, and means to control the movement of said slidable member in relation to the pressures.

10. In a torch of the character described, a body provided with separate passages therein for oxygen and an inflammable gas and extending from the inlet end of the body toward the outlet end thereof, said body having a mixing chamber associated therewith adjacent the outlet end thereof, said passages being in communication with said chamber, manually controlled valve means in said passages adjacent the inlet end thereof, and a separate means in each of said passages intermediate said valves and said chamber for controlling the flow pressures and volumes of said oxygen and gas admitted to said passages through said valve means and in the form of metering devices, one automatically variable in response to variations in pressure of the incoming oxygen and the other automatically variable in response to variations in pressure of the incoming gas, with both of said devices responsive to the varying back pressures of the combined oxygen and gas in said mixing chamber as produced by the use of torch tips having different sized preheat orifices and each device comprising two relatively movable members responsive to both incoming pressure and back pressure and one of which members is provided with a constricted metering passage therethrough and the other of which members is provided with means for varying the effective size of the inlet end of said metering passage when the relationship between said members is changed by their relative movement, and means to control said relative movement between said members in relation to the pressures.

11. In an apparatus for producing and controlling a combustible mixture of a plurality of gases, separate conduits each adapted to be connected to a source of a respective gas under pressure, a housing having a mixing chamber therein, said conduits terminating in said chamber, an outlet conduit from said chamber to a burner head, and separate means associated with said conduits between said chamber and the inlet ends of said conduits for controlling the flow pressures and volumes of the gases flowing through said conduits and in the form of metering devices each automatically responsive to variations in pressure of the incoming gas in its respective conduit and all responsive to the back pressure of the combined or intermixed gases in said mixing chamber, said metering devices being adjustable independently of each other and each comprising a pair of members one of which is responsive to incoming pressure and to back pressure to move relative to the other, one of said members being provided with a constricted metering inlet opening communicating with a passage through said one member and the other of said members being provided with means for varying the effective size of said inlet opening when the relationship between said members is changed by their relative movement, and means to control said relative movement between said members in relation to the pressures.

JOHN C. CROWLEY.